(12) United States Patent
Hayashi

(10) Patent No.: US 6,817,617 B2
(45) Date of Patent: Nov. 16, 2004

(54) TRICYCLE

(75) Inventor: Masayasu Hayashi, Fujisawa (JP)

(73) Assignees: Avantec Corporation, Chiba (JP); K Design Co., Ltd., Kanagawa (JP)

(*) Notice: Subject to any disclaimer, the term of this patent is extended or adjusted under 35 U.S.C. 154(b) by 0 days.

(21) Appl. No.: 10/477,529

(22) PCT Filed: May 17, 2002

(86) PCT No.: PCT/JP02/04802

§ 371 (c)(1),
(2), (4) Date: Nov. 21, 2003

(87) PCT Pub. No.: WO02/094648

PCT Pub. Date: Nov. 28, 2002

(65) Prior Publication Data

US 2004/0140645 A1 Jul. 22, 2004

(30) Foreign Application Priority Data

May 21, 2001 (JP) ........................................ 2001-151449

(51) Int. Cl.[7] .............................................. B60G 17/00
(52) U.S. Cl. ...................... 280/5.509; 280/282; 280/62; 280/124.1; 280/267
(58) Field of Search ........................... 280/5.508, 5.509, 280/210, 282, 124.103, 62, 267; D12/112

(56) References Cited

U.S. PATENT DOCUMENTS

| 3,561,778 | A | * | 2/1971 | La Brie | 280/7.14 |
| 4,277,078 | A | * | 7/1981 | Root | 280/269 |
| 4,351,410 | A | * | 9/1982 | Townsend | 180/210 |
| 4,375,293 | A | * | 3/1983 | Solbes | 280/22.1 |
| 4,634,137 | A | * | 1/1987 | Cocksedge | 280/256 |
| 4,740,004 | A | * | 4/1988 | McMullen | 280/269 |
| 6,367,824 | B1 | * | 4/2002 | Hayashi | 280/62 |

* cited by examiner

Primary Examiner—Lesley D. Morris
Assistant Examiner—Daniel Yeagley
(74) Attorney, Agent, or Firm—Arent Fox, PLLC.

(57) ABSTRACT

In a tricycle in which left and right front forks (30L, 30R) for rotatably supporting left and right front wheels (WFL, WFR) respectively are disposed on laterally opposite sides of a handle post (21) to extend upwards and downwards and are turnably carried on left and right side posts (29L, 29R) supported on the handle post (21), and an upper link (35U) connected at its opposite ends to the left and right side posts (29L, 29R) and a lower link (35D) connected at its opposite ends to the left and right side posts (29L, 29R) are turnably connected at their central portions to the handle post (21), the left and right side posts (29L, 29R) are disposed in an inclined state, so that the distance between both of the side posts (29L, 29R) is decreased toward their upper portions. Thus, the tricycle can be braced sufficiently by inner one of the front wheels during bank-traveling thereof.

2 Claims, 11 Drawing Sheets

TRICYCLE

FIELD OF THE INVENTION

The present invention relates to a tricycle in which a steering shaft leading to a steering handlebar is turnably carried on a handle post provided at a front end of a vehicle body frame assembly; left and right front forks for rotatably supporting left and right front wheels respectively are disposed on laterally opposite sides of the handle post to extend upwards and downwards and are turnably carried on left and right side posts supported on the handle post; the steering shaft is connected to the front forks to enable the steering of the front wheels in response to the turning operation of the steering shaft; an upper link connected at opposite ends thereof to the left and right side posts and a lower link disposed below the upper link and connected at opposite ends thereof to the left and right side posts are turnably connected at central portions thereof to the handle post; and a driven wheel is supported at a rear portion of the vehicle body frame assembly.

The terms "left" and "right" used in this specification indicate left and right in a state in which the tricycle is turned forwards in a traveling direction.

BACKGROUND ART

Such a tricycle is already known from WO99/61304. In this tricycle, the steering travelability is enhanced by enabling a bank-traveling of the tricycle in an attitude inclined either leftwards or rightwards.

It should be noted here that in the conventionally known tricycle, left and right side posts are disposed on laterally opposite sides of a handle post to extend vertically in parallel to each other, and left and right front wheels rotatably carried on left and right front forks turnably supported on the side posts are in contact with road surface at right angles during straight traveling of the tricycle. However, during steep-bank traveling of the tricycle with the vehicle body frame assembly inclined largely either leftwards or rightwards, outer one of the left and right front wheels may be floated from the road surface, and the inner front wheel and the rear wheel may be in states in which they are in contact with the road surface, in some cases. In the conventionally known tricycle, the inner front wheel is brought into contact with the road surface in an inclined attitude, and during steep-bank traveling of the tricycle inclined largely, there is a possibility that the bracing of the tricycle by the front wheel which is in contact with the road surface is insufficient.

DISCLOSURE OF THE INVENTION

The present invention has been accomplished with such circumstances in view, and it is an object of the present invention to provide a tricycle constructed so that the tricycle can be braced sufficiently by an inner front wheel during bank-traveling thereof.

To achieve the above object, according to a first aspect and feature of the present invention, there is provided a tricycle in which a steering shaft leading to a steering handlebar is turnably carried on a handle post provided at a front end of a vehicle body frame assembly; left and right front forks for rotatably supporting left and right front wheels respectively are disposed on laterally opposite sides of the handle post to extend upwards and downwards and are turnably carried on left and right side posts supported on the handle post; the steering shaft is connected to the front forks to enable the steering of the front wheels in response to the turning operation of the steering shaft; an upper link connected at opposite ends thereof to the left and right side posts and a lower link disposed below the upper link and connected at opposite ends thereof to the left and right side posts are turnably connected at central portions thereof to the handle post; and a driven wheel is supported at a rear portion of the vehicle body frame assembly, characterized in that the left and right side posts are disposed in an inclined state, so that the distance between both of the side posts is decreased toward upper portions thereof.

With such arrangement of the first feature, the left and right side posts are inclined so that the distance between both of the side posts is decreased toward their upper portions. Therefore, during steep-bank traveling of the tricycle with the vehicle body frame assembly inclined largely either leftwards or rightwards, one of the left and right side posts assumes an attitude vertical or near vertical to a road surface, and the front wheel rotatably carried on the front fork supported by the one side post, i.e., the inner front wheel is in contact with the road surface in an attitude vertical or near vertical to the road surface. Thus, the tricycle can be braced sufficiently by the inner front wheel during the bank-traveling thereof.

According to a second aspect and feature of the present invention, in addition to the arrangement of the first feature, the lengths of the upper and lower links are set to be equal to each other, and the amount of protrusion, from the left and right side posts, of lower brackets secured to the left and right side posts in order to connect the opposite ends of the lower link is set to be larger than the amount of protrusion, from the left and right side posts, of upper brackets secured to the left and right side posts in order to connect the opposite ends of the upper link. With such arrangement, regardless of the inclination of the left and right side posts, the upper and lower links as framing members forming the substantially parallel link mechanism can be formed in common with each other.

Further, according to a third aspect and feature of the present invention, in addition to the first or second feature, an upright attitude-maintaining means for exhibiting a spring force for biasing the handle post to the upright attitude thereof by the either leftward or rightward tilting of the handle post is provided between one of the upper and lower links and the handle post on either one of the left or right of the handle post. With such arrangement, the spring force for biasing the handle post to its upright attitude can be applied to the handle post during either leftward or rightward tilting of the handle post by the single upright attitude-maintaining means disposed on the either left or right of the handle post, leading to a simplified construction.

BRIEF DESCRIPTION OF THE DRAWINGS

FIGS. 1 to 9 show a first embodiment of the present invention. FIGS. 10 and 11 show a second embodiment of the present invention.

BEST MODE FOR CARRYING OUT THE INVENTION

The mode for carrying out the present invention will now be described by way of embodiments shown in the accompanying drawings.

FIGS. 1 to 9 show a first embodiment of the present invention.

Figure 1:
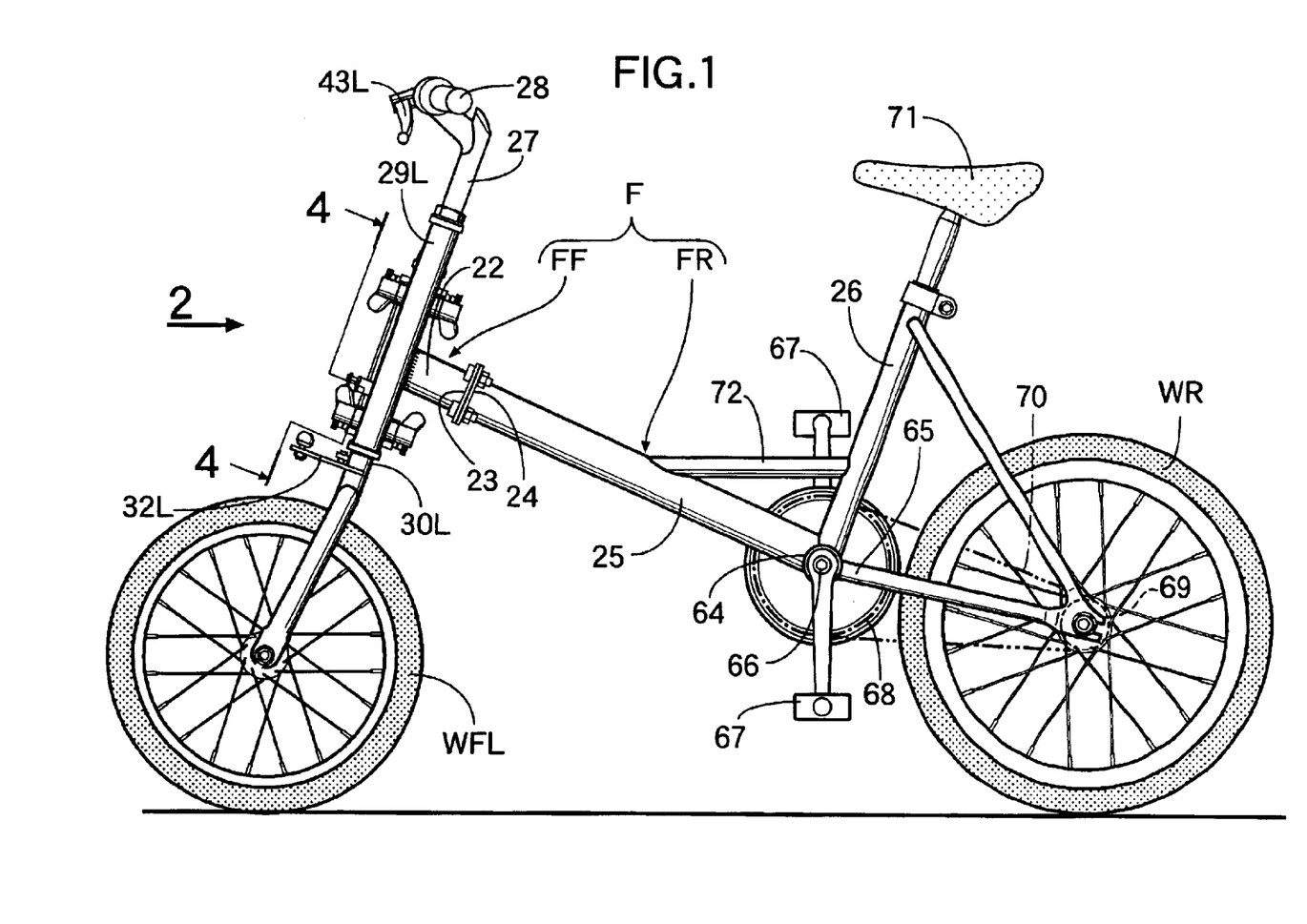
FIG. 1 is a side view of a tricycle.
Figure 2:
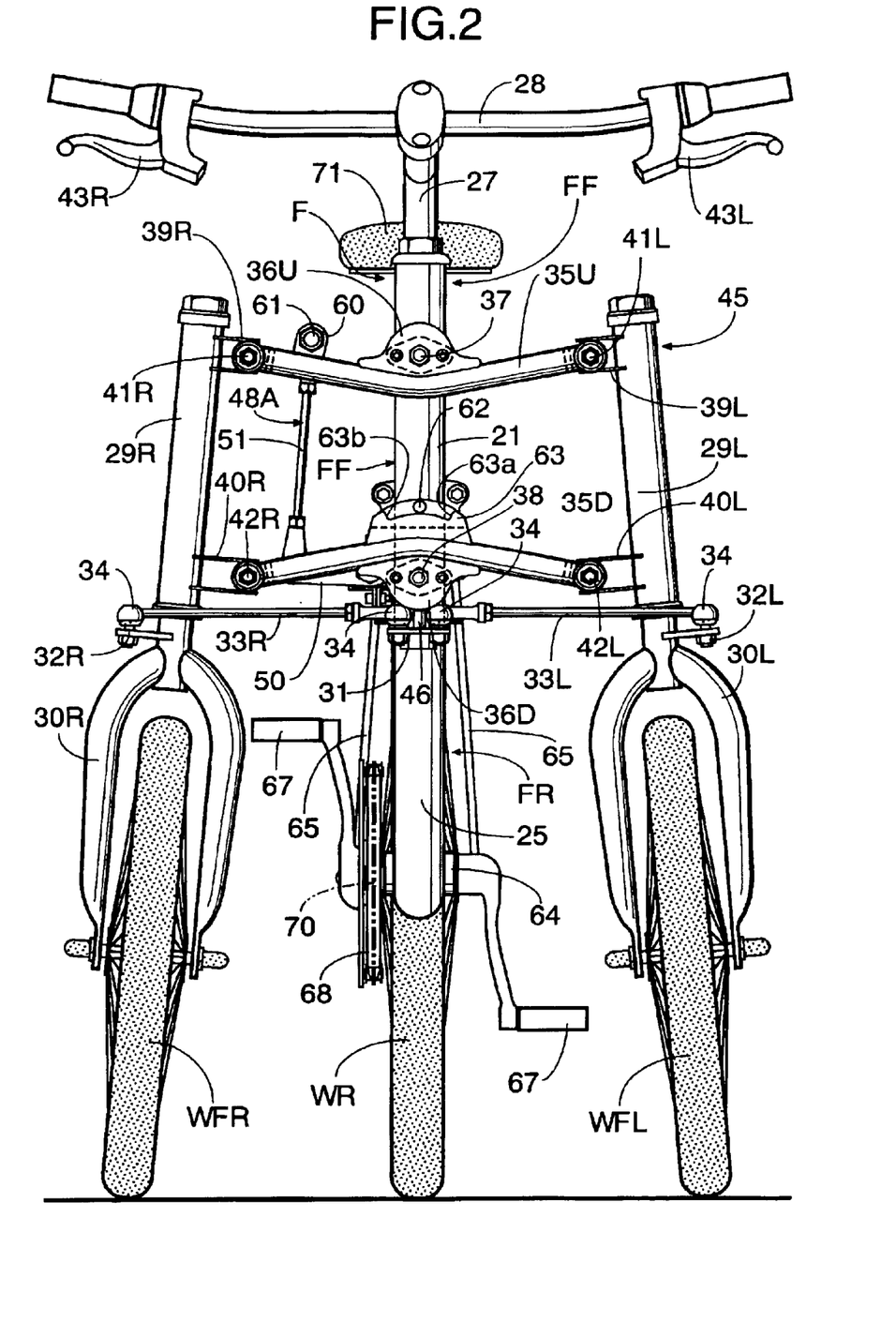
FIG. 2 is an enlarged front view taken in the direction of an arrow 2 in FIG. 1.
Figure 3:
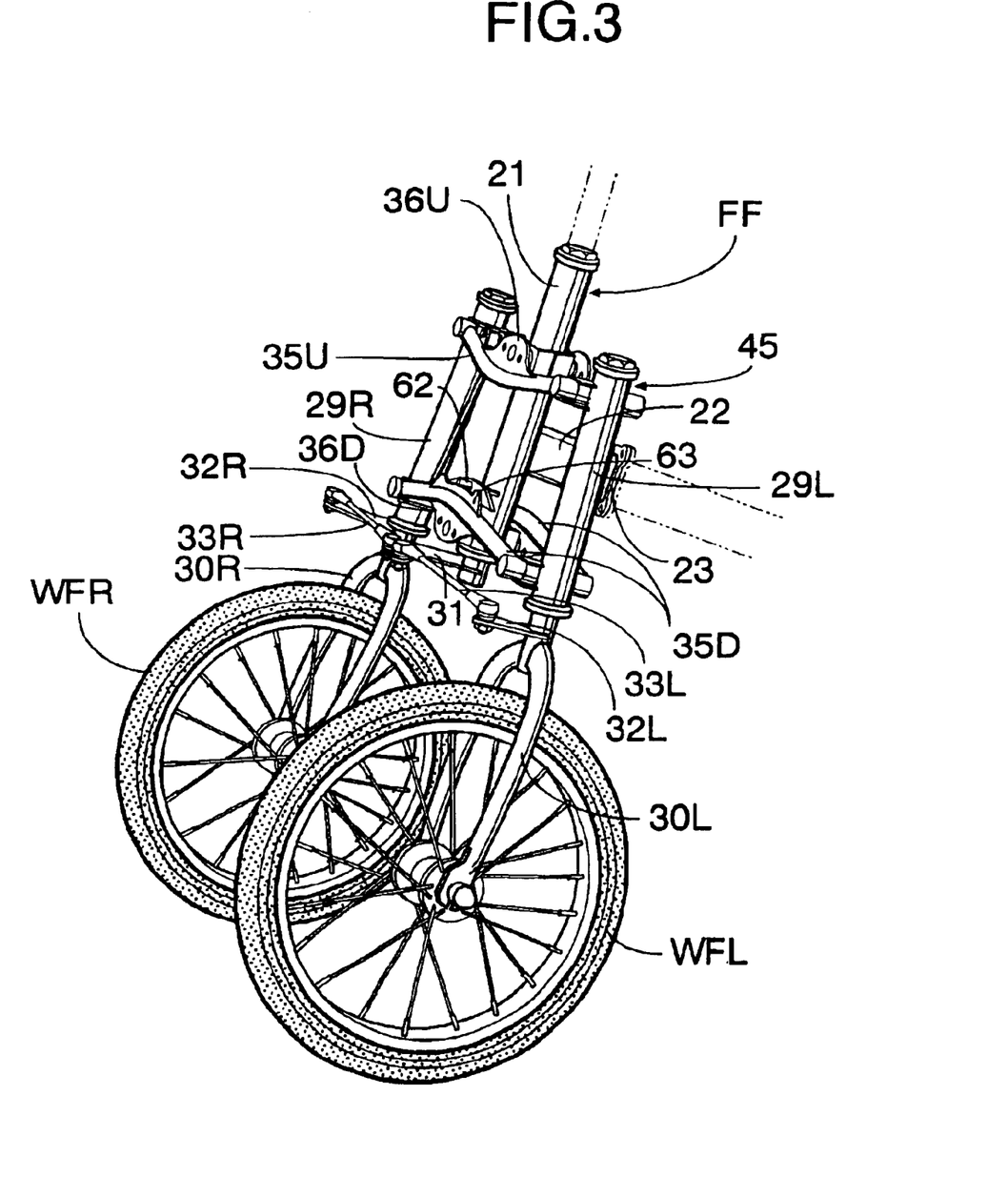
FIG. 3 is a perspective view of a front portion of the tricycle.

Referring first to FIGS. 1 to 3, a vehicle body frame assembly F of a tricycle comprises a front frame FF and a rear frame FR coupled to each other. The front frame FF includes a handle post 21, and a pipe-shaped connecting frame section 22 which is connected to a back of an intermediate portion of the handle post 21 close to a lower end and extends slightly from the handle post 21 to incline downwards in a rearward direction. A flange 23 is secured to a rear end of the connecting frame section 22. The rear frame FR includes a pipe-shaped main frame section 25 which is provided at its front end with a flange 24 detachably coupled to the flange 23 and extends to incline downwards in a rearward direction, and a saddle post 26 which is connected at its lower end to a rear end of the main frame section 25 and which extends to incline upwards in a rearward direction.

A steering shaft 27 is rotatably carried and fitted in the handle post 21 extending upwards and downwards, and a steering handlebar 28 is fixedly mounted at an upper end of the steering shaft 27. A brake lever 43R for braking left and right front wheels WFL and WFR in operative association with each other is turnably mounted to a right end of the steering handlebar 28, and a brake lever 43L for braking a rear wheel WR is turnably mounted to a left end of the steering handlebar 28.

Left and right cylindrical side posts 29L and 29R are disposed on left and right opposite sides of the handle post 21 to extend upwards and downwards. A left front fork 30L is turnably carried on the left side post 29L, and a right front fork 30R is turnably carried on the right side post 29R. The left front wheel WFL is rotatably supported on the left front fork 30L, and the right front wheel WFR is rotatably supported on the right front fork 30R. Moreover, center planes for rotation of the left and right front wheels WFL and WFR are established to include axes of the left and right side posts 29L and 29R or to extend in parallel to the axes of the left and right side posts 29L and 29R.

The left and right side posts 29L and 29R are disposed in an inclined manner, so that the distance between both of them is decreased toward their upper portions. In a state in which the vehicle body frame assembly F is in an upright attitude, the left and right front wheels WFL and WFR are in contact with a road surface in a slightly inward inclined attitude.

Referring also to FIGS. 4 to 7C, a pitman arm 31 is secured to a lower end of the steering shaft 27 below the lower end of the handle post 21, and knuckle arms 32L an 32R are secured to the left and right front forks 30L and 30R below lower ends of the left and right side posts 29L and 29R, respectively. Opposite ends of tie rods 33, 33 are connected to the pitman arm 31 and the knuckle arms 32L and 32R through ball joints 34, 34.

Figure 7A:
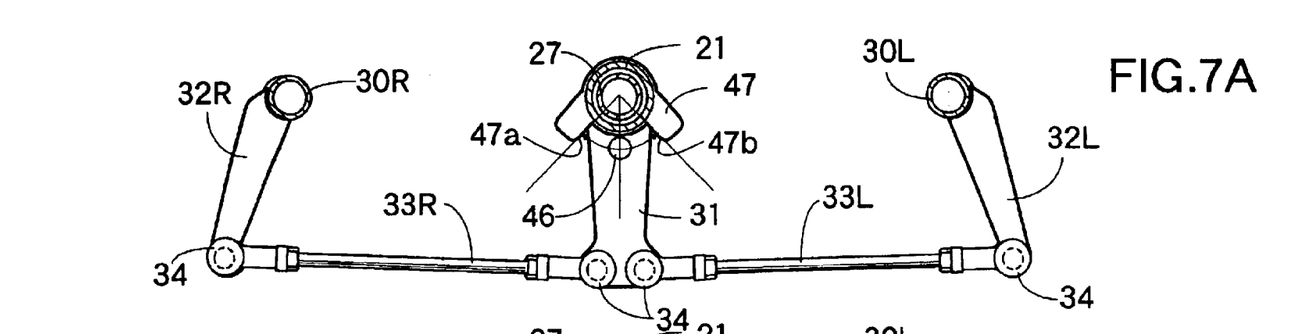
FIGS. 7A, 7B and 7C are sectional views taken along a line 7—7 in FIG. 4 and showing operational situations varied in sequence.
Figure 7B:
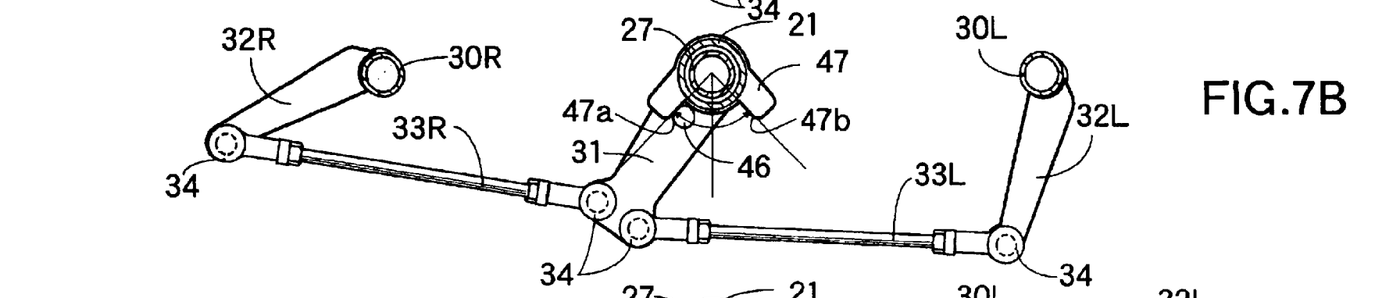
Figure 7C:
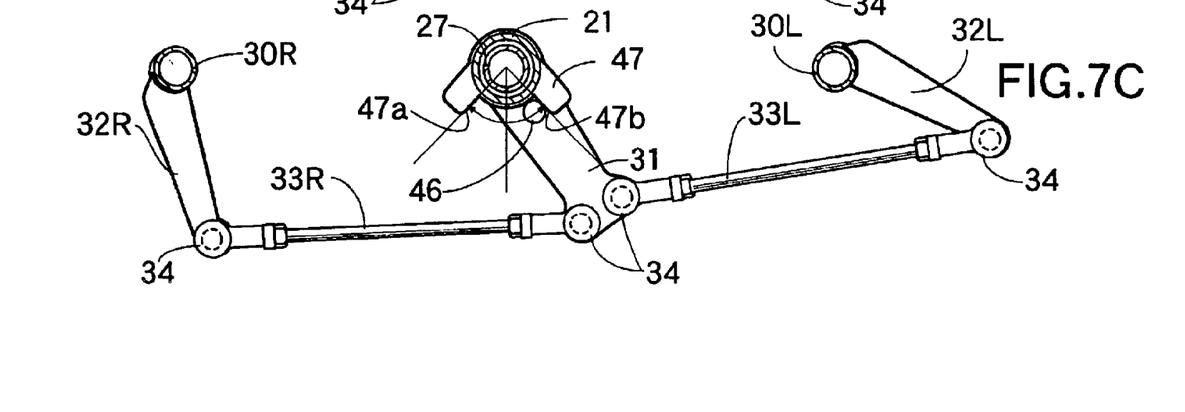

Thus, when the steering handlebar 28 is turned rightwards from a state which is shown in FIG. 7A and is in a neutral position, the pitman arm 31 is turned rightwards through the steering shaft 27 as shown in FIG. 7B, and in response to this, the left and right knuckle arms 32L and 32R are turned rightwards through the tie rods 33L and 33R, whereby the left and right front wheels WFL and WFR are steered rightwards. On the other hand, when the steering handlebar 28 is turned leftwards from the state which is shown in FIG. 7A and is in the neutral position, the pitman arm 31 is turned leftwards through the steering shaft 27 as shown in FIG. 7C, and in response to this, the left and right knuckle arms 32L and 32R are turned leftwards through the tie rods 33L and 33R, whereby the left and right front wheels WFL and WFR are steered leftwards.

Moreover, a pin 46 is embedded in an upper surface of the pitman arm 31 to extend upwards and downwards, and a restraining plate 47 is secured to the handle post 21 above the pitman arm 31. The restraining plate 47 is provided with a restraining surface 47a for abutting against the pin 46 to define an end of the rightward turning movement of the pitman arm 31 when the pitman arm 31 has been turned rightwards, and a restraining surface 47b for abutting against the pin 46 to define an end of the leftward turning movement of the pitman arm 31 when the pitman arm 31 has been turned leftwards.

Figure 4:
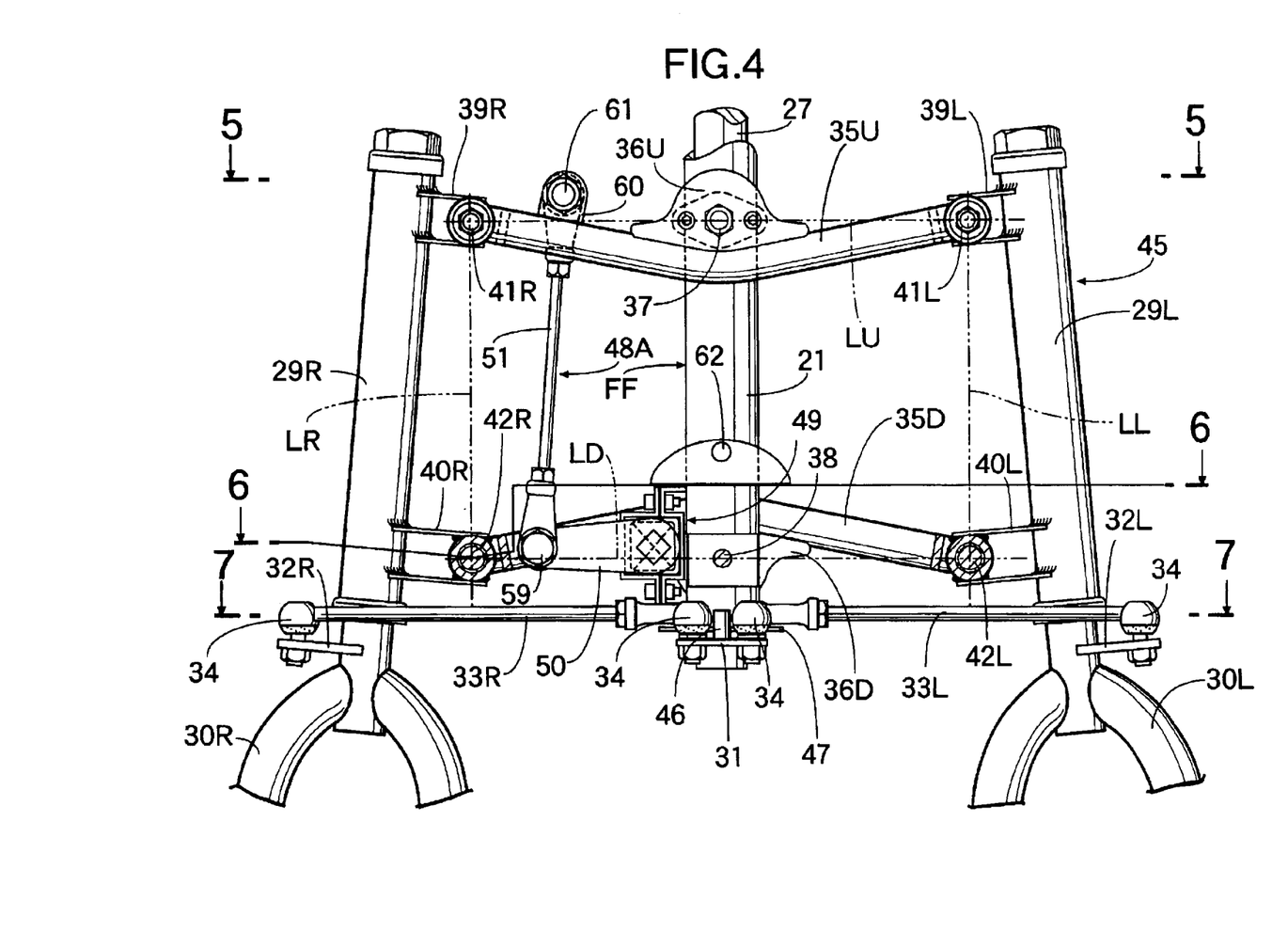
FIG. 4 is a sectional view taken along a line 4—4 in FIG. 1.
Figure 5:
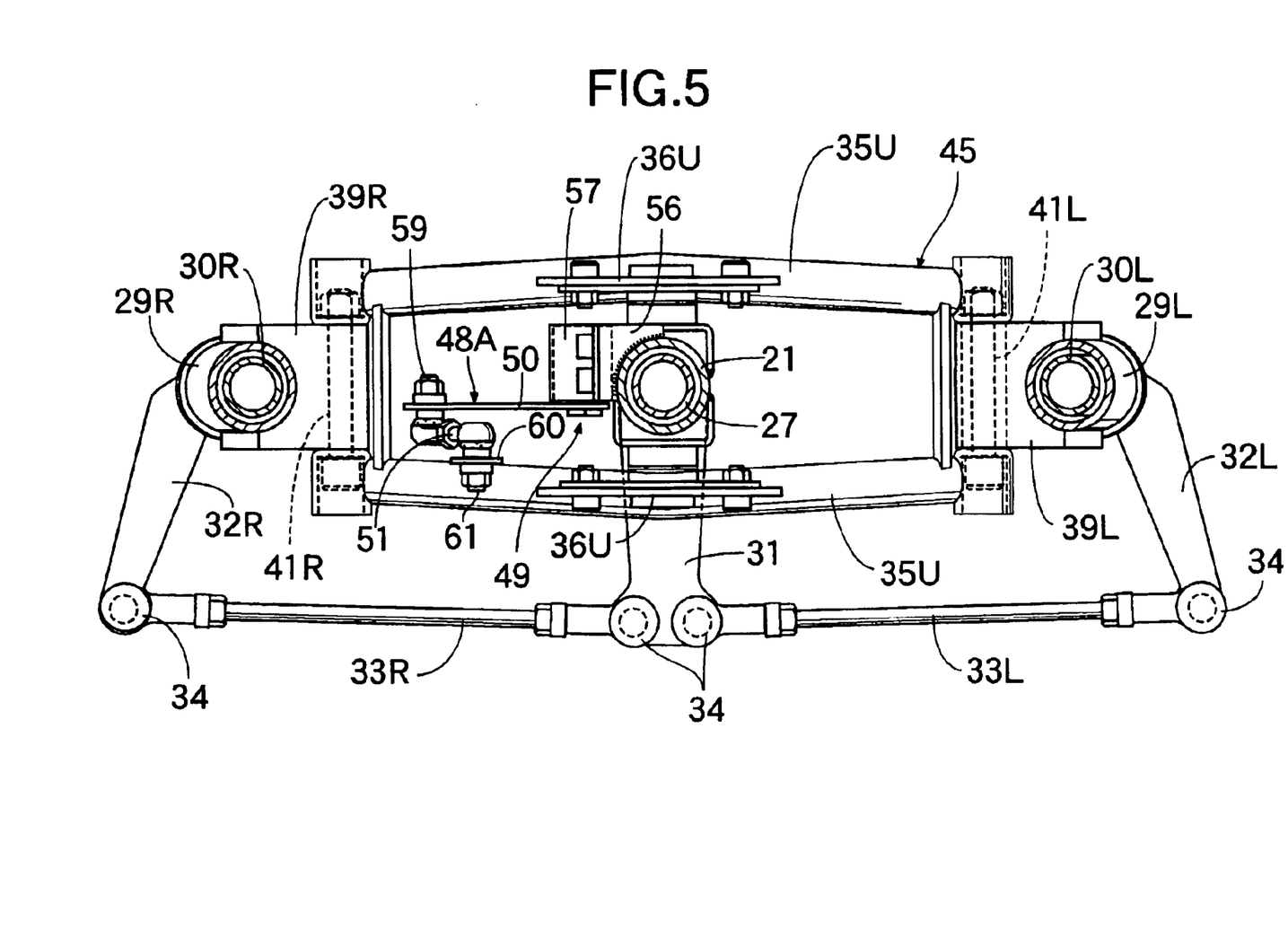
FIG. 5 is a sectional view taken along a line 5—5 in FIG. 4.
Figure 6:
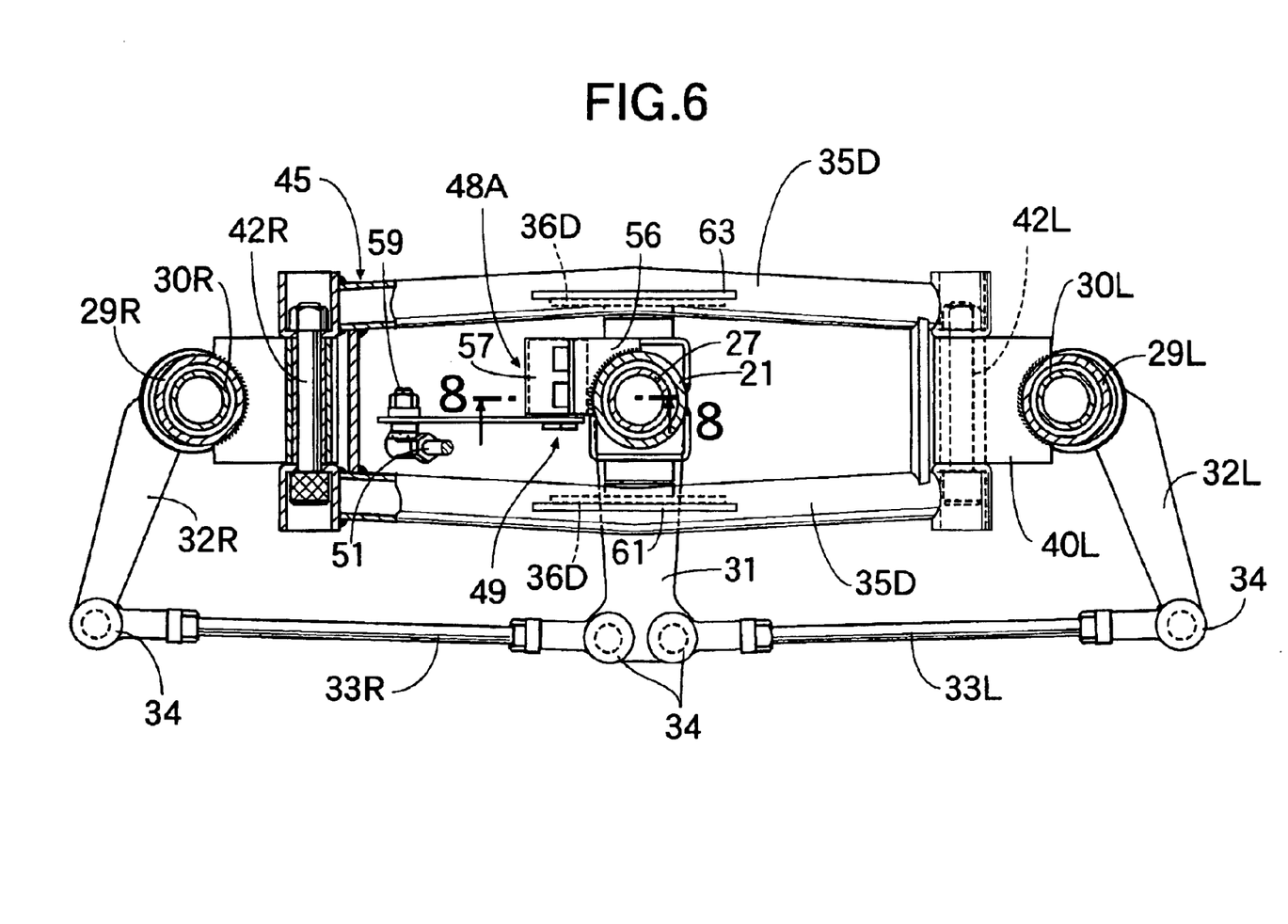
FIG. 6 is a sectional view taken along a line 6—6 in FIG. 4.

Two sets of upper links 35U, 35U and lower links 35D, 35D, upper and lower ones of which form a pair, are disposed in front of and in the rear of the handle post 21. The links 35U and 35D have the same shape in which a lengthwise central portion of a pipe made of a metal is bent at an obtuse angle, and have equal lengths. Each of the upper links 35U is disposed with a bent portion at its lengthwise central portion turned downwards, and each of the lower links 35D is disposed with a bent portion at its lengthwise central portion turned upwards.

Upper brackets 39L and 39R are secured to the left and right side posts 29L and 29R at their portions corresponding to the opposite ends of the upper links 35U, and lower brackets 40L and 40R are secured to the left and right side posts 29L and 29R at their portions corresponding to the opposite ends of the lower links 35D. The upper links 35U are turnably connected at their opposite ends to the upper brackets 39L and 39R through connecting pins 41L and 41R each having an axis extending longitudinally on a horizontal phantom straight line LU in the state in which the vehicle body frame assembly F is in the upright attitude, and the lower links 35D are turnably connected at their opposite ends to the lower brackets 40L and 40R through connecting pins 42L and 42R each having an axis extending longitudinally on a horizontal phantom straight line LD in the state in which the vehicle body frame assembly F is in the upright attitude. Moreover, the axes of the connecting pins 41L and 42L are disposed on a phantom line LL extending upwards and downwards to be perpendicular to the phantom lines LU and LD, and the axes of the connecting pins 41R and 42R are disposed on a phantom line LR extending upwards and downwards to be perpendicular to the phantom lines LU and LD.

Namely, the upper links 35U and the lower links 35D and the left and right side posts 29L and 29R function as a substantially parallel link mechanism 45.

Upper link brackets 36U are mounted at lengthwise central portions of the upper links 35U and turnably connected to the handle post 21 through connecting pins 37 each having an axis extending longitudinally. Lower link brackets 36D are mounted at lengthwise central portions of the lower links 35D and turnably connected to the handle post 21 through connecting pins 38 each having an axis extending longitudinally. Moreover, the axes of the connecting pins 37 are disposed on the phantom straight line LU passing through the connecting pin 41L and 41R, and the axes of the connecting pins 38 are disposed on the phantom straight line LD passing through the connecting pin 42L and 42R.

The left and right side posts 29L and 29R are inclined so that the distance between both of them is decreased toward their upper portion when the vehicle body frame assembly F is in the upright attitude. In order to construct the substantially parallel link mechanism 45 using the left and right side posts 29L and 29R inclined as described above as components, the amount of protrusion of the lower brackets 40L and 40R secured to the side posts 29L and 29R from the side posts 29L and 29R is set to be larger than the amount of protrusion of the upper brackets 39L and 39R secured to the side posts 29L and 29R from the side posts 29L and 29R.

An upright attitude-maintaining means 48A is provided between the handle post 21 and the right side, for example, of the upper link 35U in the link mechanism 45.

Figure 8:
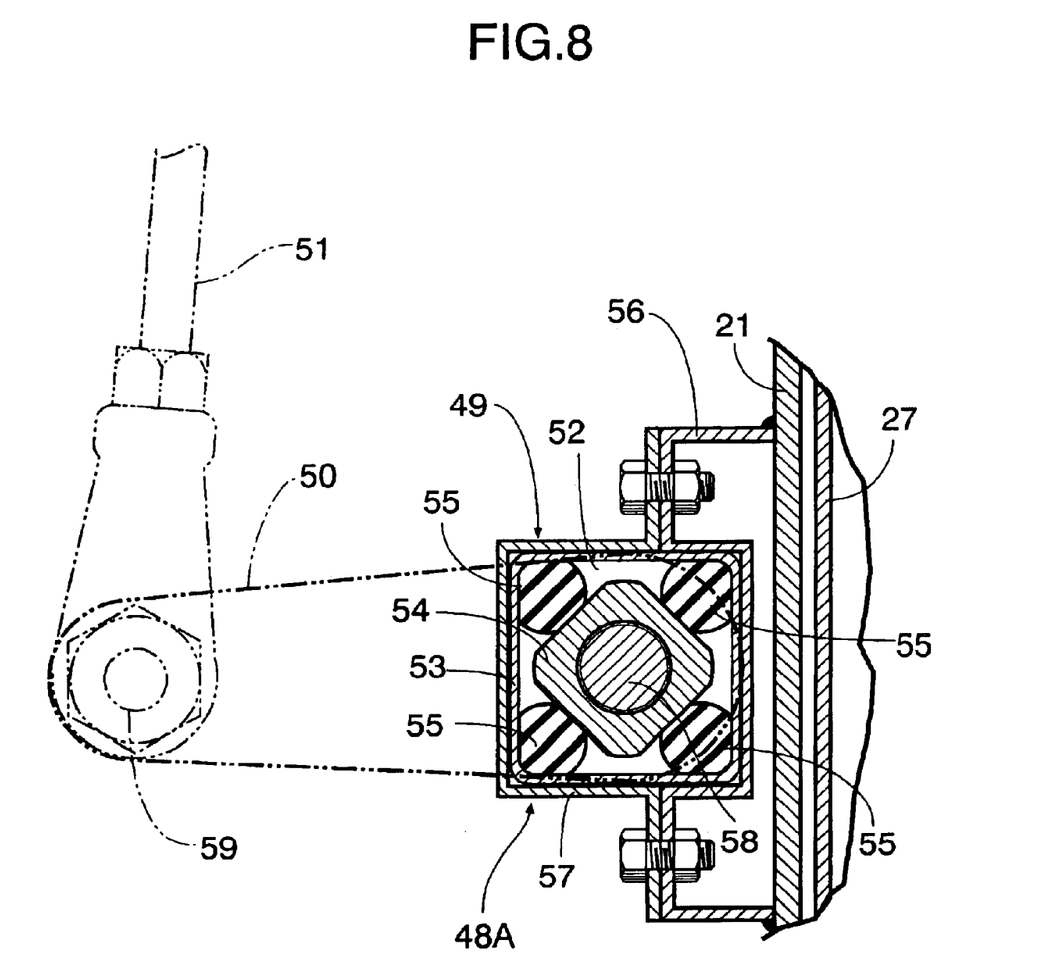
FIG. 8 is an enlarged sectional view taken along a line 8—8 in FIG. 6.

Referring also to FIG. 8, the upright attitude-maintaining means 48A includes a conventionally well-known night halt-type spring mechanism 49 mounted on the handle post 21, a turn arm 50 connected at its base end to the spring mechanism 49, and a rod 51 extending upwards and downwards in such a manner that it is turnably connected at its lower end to a tip end of the turn arm 50 and at its upper end to the upper link 45U.

The spring mechanism 49 includes a housing 53 defining a spring chamber 52 having a substantially square cross-sectional shape, a spring actuator 54 disposed within the spring chamber 52 and having a substantially square cross-sectional shape, and cylindrical rubber springs 55, 55 charged at four corners in the spring chamber 52 to engage flat sides of the spring actuator 54. The housing 53 is fixed to the handle post 21 by a bracket 56 secured to the handle post 21, and a mounting member 57 fastened to the bracket 56 in such a manner that the housing 53 is sandwiched between the mounting member 57 and the bracket 56.

A pivot 58 is secured to the base end of turn arm 50 to extend longitudinally and non-turnably coupled to the spring actuator 54 of the spring mechanism 49. The turn arm 50 is turnably connected at its tip end to a lower end of the rod 51 through a connecting pin 59 having an axis extending longitudinally. Further, a bracket plate 60 is secured to the upper link 35U, and the rod 50 is connected at its upper end to the bracket plate 60 through a connecting pin 61 having an axis parallel to the connecting pin 59.

Figure 9:
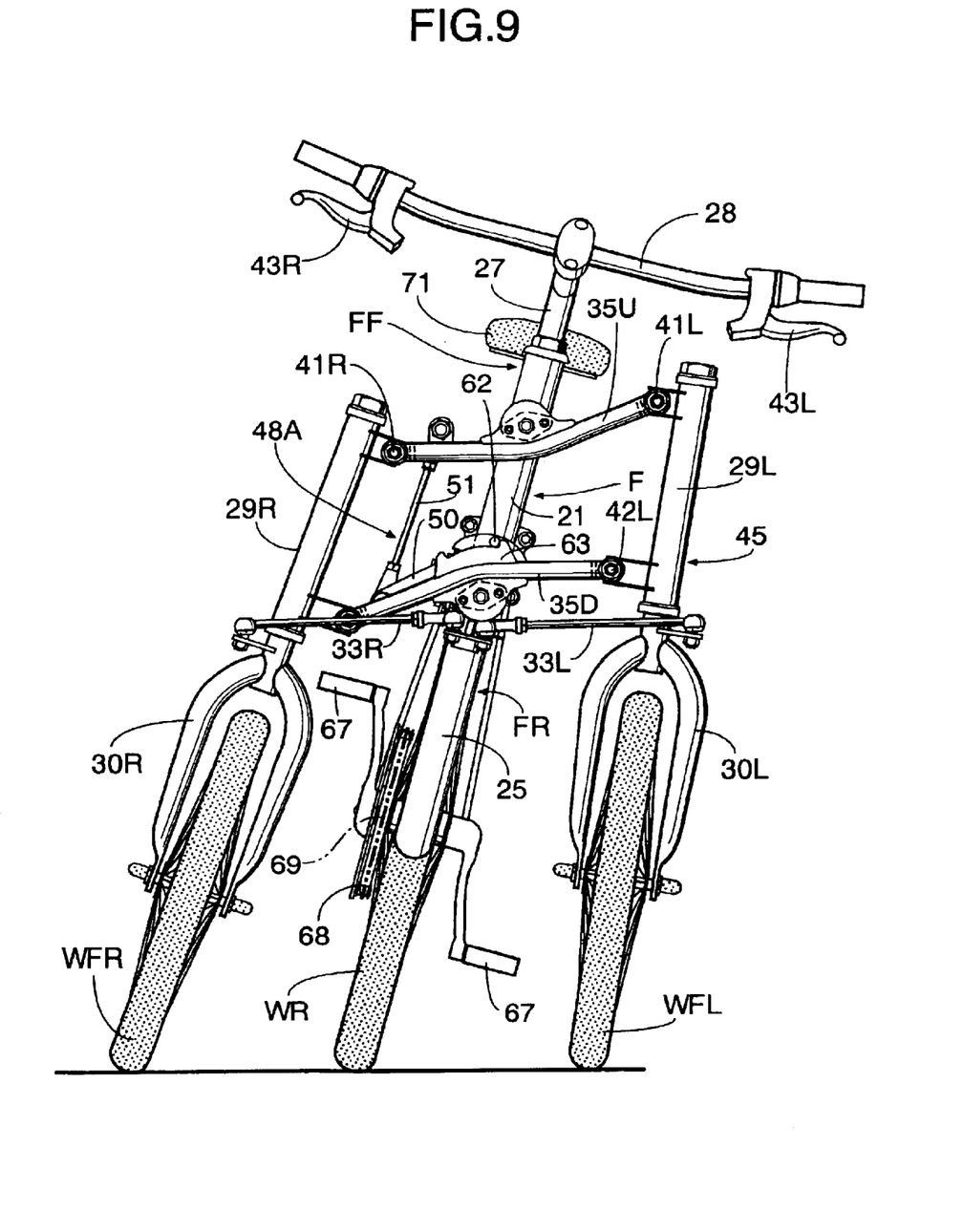
FIG. 9 is a front view similar to FIG. 2 but in a state in which the tricycle is inclined leftwards.

The substantially parallel link mechanism 45 is comprised of the left and right side posts 29L and 29R and the upper and lower links 35U and 35D, and the upper and lower links 35U and 35D are turnably connected at their central portions to the handle post 21, respectively, whereby the side posts 29L and 29R can be also tilted leftwards in response to the leftward tilting movement of the handle post 21, as shown in FIG. 9. In this case, in the upright attitude-maintaining means 48A, the turn arm 50 is turned downwards as the rod 51 is pushed downwards, and the spring actuator 54 of the spring mechanism 49 is turned in a counterclockwise direction in FIG. 8. However, the rubber springs 55, 55 are compressed and deformed obliquely on the flat sides of the spring actuator 54 in response to the turning of the spring actuator 54, a spring force for returning the handle post 21 to the upright attitude is applied to the handle post 21 by a spring force exhibited by each of the rubber springs 55, 55 with the compression of the latter. On the other hand, when the handle post 21 is tilted rightwards from the upright attitude, the spring actuator 54 is turned in a direction opposite from the above-described direction, i.e., in a clockwise direction in FIG. 8, and a spring force for returning the handle post 21 to the upright attitude is applied to the handle post 21 by a spring force exhibited by each of the rubber springs 55, 55 in response to the turning of the spring actuator 54.

Pins 62 each having an axis extending longitudinally are secured to front and back points at a lower portion of the handle post 21, and limiting plates 63 are secured to the central portions of the lower links 35D and each have a limiting surface 63a for abutting against the pin 62 to limit the leftward tilting of the handle post 21, and a limiting surface 63b for abutting against the pin 62 to limit the rightward tilting of the handle post 21.

Referring again to FIG. 1, a tubular member 64 is secured to a connection between the main frame section 25 and the saddle pipe 26 included in the rear frame FR, and the rear wheel WR which is a driven wheel is pivotally supported at rear ends of a pair of left and right rear forks 65 secured to the tubular member 64 and the saddle pipe 26. A crankshaft 66 is rotatably supported at the tubular member 64, and crank pedals 67, 67 are fixed to opposite ends of the crankshaft 66. Moreover, a driving sprocket 68 is fixed to the crankshaft 66 on the right of the tubular member 64, and an endless chain 70 is wound around a driven sprocket 69 fixed to the rear wheel WR and the driving sprocket 68. Therefore, the rear wheel WR is driven in rotation by the stepping-on operation of the crank pedals 67, 67.

A saddle 71 is mounted at an upper end of the saddle post 26, and a reinforcing frame 72 is mounted between the main frame section 25 and the saddle post 26.

The operation of the first embodiment will be described below. The substantially parallel link mechanism 45 is comprised of the left and right side posts 29L and 29R and the upper and lower links 35U and 35D, and the upper and lower links 35U and 35D are turnably connected at their central portions to the handle post 21, respectively. Therefore, the side posts 29L and 29R are also tilted leftwards or rightwards in response to the leftward or rightward tilting of the handle post 21, whereby the left and right front wheels WFL and WFR can be tilted leftwards or rightwards. Thus, it is possible to carry out the bank traveling of the tricycle such that the tricycle travels with the vehicle body frame assembly F inclined either leftwards or rightwards, leading to an enhancement in steering travelability.

The upright attitude-maintaining means 48A is provided between the handle post 21 and the upper link 35D. When the vehicle body frame assembly F has been tilted either leftwards or rightwards, the spring force for returning the handle post 21 to the upright attitude is applied to the handle post 21, and when the tricycle is at standstill in an unoccupied-seat state, an occupant can ride on the tricycle with the vehicle body frame assembly F brought into the upright attitude with a sense of relief. When the tricycle has been changed into a straight travel state from a turning travel state in which the vehicle body frame assembly F is in an inclined attitude, the vehicle body frame assembly F is restored to the upright attitude, leading to a further enhancement in steerability.

Moreover, the upright attitude-maintaining means 48A is provided between the upper link 35D and the handle post 21 on either the left or right of the handle post 21 (on the right in the present embodiment), and even upon either leftward or rightward tilting of the handle post 21, the spring force for returning the handle post 21 to the upright attitude can be applied to the handle post 21 by provision of the single upright attitude-maintaining means 48A, leading to a simplified construction.

The left and right side posts 29L and 29R are inclined so that the distance between both of them is decreased toward their upper portions and hence, even if the tricycle is in a steep bank travel state such that it travels with the vehicle body frame assembly F inclined largely either leftwards or rightwards, one of the left and right side posts 29L and 29R assumes an attitude vertical or near vertical to a road surface. Therefore, inner one of the front wheels WFL and WFR rotatably supported at the left and right front forks 30L and 30R is brought into contact with the road surface in an attitude vertical or near vertical to the road surface, as shown in FIG. 9, and hence, it is possible to brace the tricycle sufficiently by the inner front wheel during the bank-traveling.

Particularly, when the leftward or rightward tilting of the handle post 21 is limited as in the present embodiment, so that an unreasonable force cannot be applied to the link mechanism 45, outer one of the front wheels WFL and WFR may be floated from a road surface during steep bank-traveling of the tricycle with the vehicle body frame assembly F inclined largely either leftwards or rightwards, but the more stable bank-traveling is made possible by bracing the tricycle sufficiently by the inner front wheel, as described above.

The upper link 35U and the lower link 35D are of the same shape with the equal lengths, and the amounts of protrusion, from the side posts 29L and 29R, of the upper and lower brackets 39L, 39R; 40L, 40R secured to the side posts 29L and 29R in order to connect the opposite ends of the upper link 35U and the lower link 35D to the left and right side posts 29L and 29R are differed from each other. Therefore, regardless of the inclination of the left and right side posts 29L and 29R, the upper and lower links 35U and 35D as the framing members forming the substantially parallel link mechanism 35 can be formed in common with each other.

Figure 10:
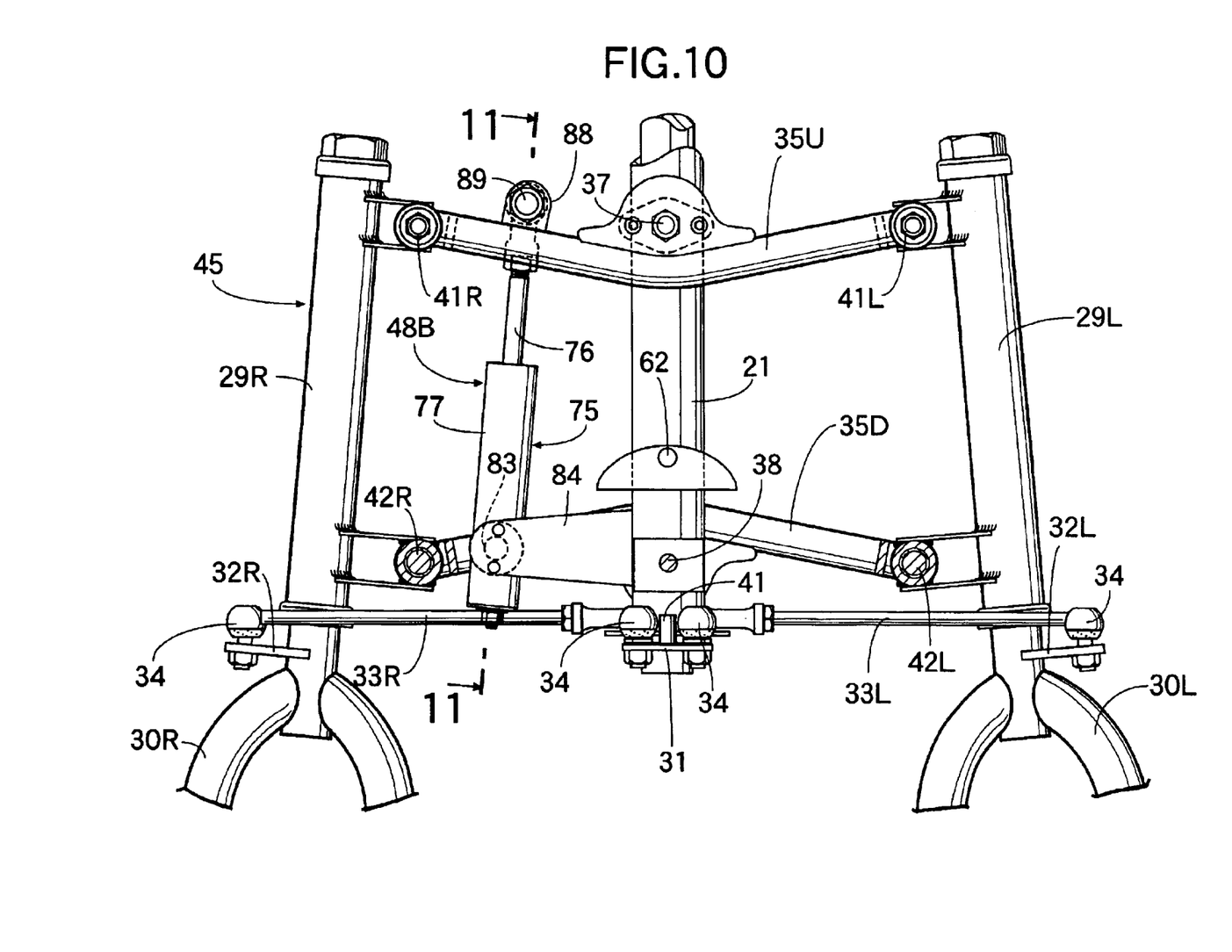
FIG. 10 is a vertical sectional front view similar to FIG. 4.
Figure 11:
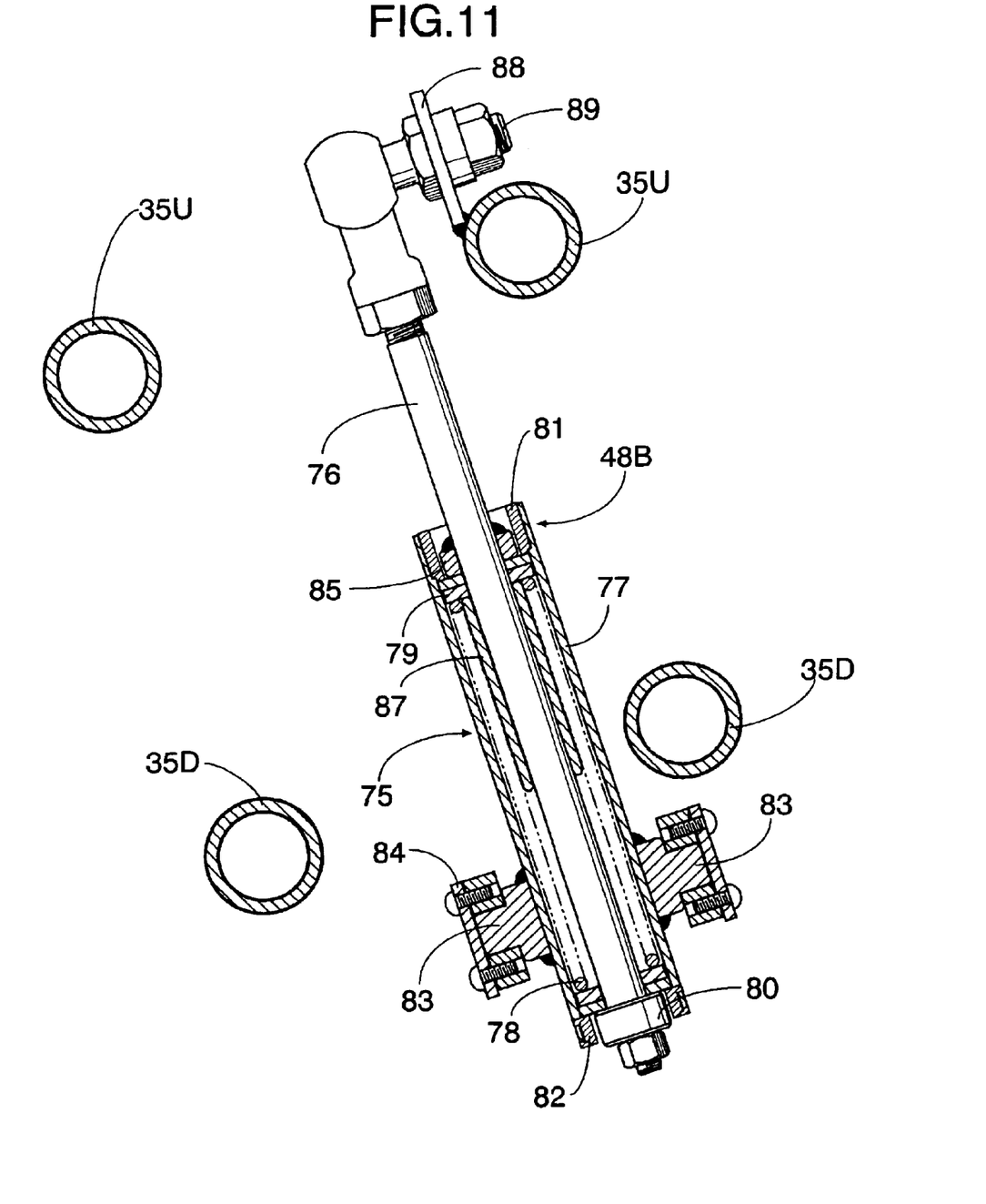
FIG. 11 is a sectional view taken along a line 11—11 in FIG. 10.

A second embodiment of the present invention will now be described with reference to FIGS. 10 and 11, wherein portions or components corresponding to those in the first embodiment are designated by the same reference symbols and numerals in FIGS. 10 and 11.

An upright attitude-maintaining means 48B is provided between a handle post 21 and the right side, for example, of an upper link 35U.

The upright attitude-maintaining means 48B includes a spring mechanism 75 turnably supported on the handle post 21, and a rod 76 which is connected to the spring mechanism 75, extends upwards and is turnably connected at its upper end to the upper link 35U.

The spring mechanism 76 includes an accommodation tube 77 formed into a cylindrical shape to extend upwards and downwards, a coil spring 78 accommodated in the accommodation tube 77, a pair of upper and lower receiving members 79 and 80 which receive opposite ends of the coil spring 78 and are slidably fitted in the accommodation tube 77, an upper limiting member 81 fixed to an upper end of the accommodation tube 77 to limit an upper limit position of the upper receiving member 79 within the accommodation tube 77, and a lower limiting member 82 fixed to a lower end of the accommodation tube 77 to limit an upper limit position of the lower receiving member 80 within the accommodation tube 77.

A pair of support shafts 83, 83 having an axis extending in a longitudinal direction of the vehicle body frame assembly F are secured coaxially to opposite sides of a lower portion of the accommodation tube 77 and turnably carried on a bracket 84 secured to a lower portion of the handle post 21.

A lower portion of the rod 76 is axially movably passed through the receiving members 79 and 80 of the spring mechanism 76, and an abutment piece 85 capable of abutting against the receiving member 79 from above and an abutment piece 86 capable of abutting against the receiving member 80 from below are fixed to the rod 76. A limiting tube 87 for limiting the shortest distance between both of the receiving members 79 and 80 is accommodated in the accommodation tube 77 to surround the rod 76.

Further, the rod 76 is turnably connected at its upper end to a bracket 88 secured to the upper link 35U through a connecting pin 89 having an axis extending longitudinally.

Such upright attitude-maintaining means 48B ensures that when the rod 76 is pushed downwards in response to the leftward tilting of the handle post 21, the abutment piece 85 pushes the receiving member 79 downwards so as to compress the coil spring 78, and a spring force for returning the handle post 21 to the upright attitude is applied to the handle post 21 by a spring force exhibited by the coil spring 78 with the compression of the coil spring 78. On the other hand, when the handle post 21 is tilted rightwards from the upright attitude, the rod 76 is pulled in a direction opposite from the above-described direction, i.e., upwards, whereby the abutment piece 86 pushes the receiving member 80 upwards so as to compress the coil spring 78, and the spring force for returning the handle post 21 to the upright attitude is applied to the handle post 21 by the spring force exhibited by the coil spring 78 with the compression of the coil spring 78.

Even according to the second embodiment, a function and an effect similar to those in the first embodiment can be provided.

Although the embodiments of the present invention have been described in detail, it will be understood that the present invention is not limited to the above-described embodiments, and various modifications in design may be made.

For example, although each of the embodiments of the present invention applied to the tricycle has been described, the present invention is also applicable not only to a tricycle driven by a human power but also to a tricycle provided with a power source or a tricycle including a power source for assisting in a human power.

In addition, in each of the embodiments, the upright attitude-maintaining means 48A, 48B disposed on the right of the handle post 21 is provided between the upper link 35U and the handle post 21, but may be disposed on the left of the handle post 21, and may be provided between the handle post 21 and the lower link 35D.

What is claimed is:

1. A tricycle in which a steering shaft (27) leading to a steering handlebar (28) is turnably carried on a handle post (21) provided at a front end of a vehicle body frame assembly (F); left and right front forks (30L, 30R) for rotatably supporting left and right front wheels (WFL, WFR) respectively are disposed on laterally opposite sides of said handle post (21) to extend upwards and downwards and are turnably carried on left and right side posts (29L, 29R) supported on said handle post (21); said steering shaft (27) is connected to said front forks (30L, 30R) to enable the steering of said front wheels (WFL, WFR) in response to the turning operation of said steering shaft (27); an upper link (35U) connected at opposite ends thereof to the left and right side posts (29L, 29R) and a lower link (35D) disposed below the upper link (35U) and connected at opposite ends thereof to the left and right side posts (29L, 29R) are turnably connected at central portions thereof to said handle post (21); and a driven wheel (WR) is supported at a rear portion of the vehicle body frame assembly (F), characterized in that said left and right side posts (29L, 29R) are disposed in an inclined state so that the distance between both of said side posts (29L, 29R) is decreased toward upper portions thereof, and the lengths of said upper and lower links (35U, 35D) are set to be equal to each other, and an amount of protrusion, from the left and right side posts (29L, 29R), of lower brackets (40L, 40R) secured to the left and right side posts (29L, 29R) in order to connect the opposite ends of the lower link (35D) is set to be larger than an amount of protrusion, from the left and right side posts (29L, 29R), of upper brackets (39L, 39R) secured to the left and right side posts (29L, 29R) in order to connect the opposite ends of the upper link (35U).

2. A tricycle according to claim 1, wherein an upright attitude-maintaining means (48A, 48B) for exhibiting a spring force for biasing said handle post (21) to the upright attitude thereof by the either leftward or rightward tilting of said handle post (21) is provided between one of said upper and lower links (35U, 35D) and said handle post (21) on either one of the left or right of said handle post (21).

* * * * *